US006447834B1

(12) United States Patent
Kazuo

(10) Patent No.: US 6,447,834 B1
(45) Date of Patent: Sep. 10, 2002

(54) FEED ADDITIVE FOR THE LIVESTOCK AND THE LIKE

(76) Inventor: Uranaka Kazuo, 1053 Oazaomichi Ryugatakemachi, Amakusa-Gun, Kumamoto-Ken (JP)

( * ) Notice: Subject to any disclaimer, the term of this patent is extended or adjusted under 35 U.S.C. 154(b) by 0 days.

(21) Appl. No.: 09/997,312

(22) Filed: Nov. 30, 2001

(51) Int. Cl.⁷ .................................................. A23K 1/14
(52) U.S. Cl. ....................................... 426/635; 426/807
(58) Field of Search .................................. 426/635, 807

(56) References Cited

U.S. PATENT DOCUMENTS 5,171,575 A  * 12/1992  Shibata et al. ............... 424/442

FOREIGN PATENT DOCUMENTS

| JP | 62074249 | * | 4/1987 |
| JP | 01076990 | * | 3/1989 |
| JP | 01098476 | * | 4/1989 |
| JP | 05049408 | * | 3/1993 |

* cited by examiner

Primary Examiner—Chhaya D. Sayala
(74) Attorney, Agent, or Firm—Venable; Robert J. Frank

(57) ABSTRACT

A feed additive for livestock in which a first feed additive is prepared by mixing and pickling 50–80% by weight of urne (Japanese apricot) as a main ingredient, 1–3% by weight of shochu (Japanese distilled spirits) as a quiality-improving agent, 18–45% by weight of sugar and 1–4% by weight of additives such as vitamins for a predetermined period. A second feed additive is next prepared by mixing and pickling 65–85% by weight of urne as a main ingredient and 15–35% by weight of salt for a predetermined period. Then, the first and second feed additives are mixed in a ratio of about 1:1. 0.3–0.7% by weight of this mixture is then added to the feed.

1 Claim, No Drawings

FEED ADDITIVE FOR THE LIVESTOCK AND THE LIKE

FIELD OF THE INVENTION

The present invention relates to a feed additive for livestock and the like containing a lot of urne (Japanese apricot) as a main ingredient in which, when given to livestock such as pigs, cows or raised fish, suppresses their diseases and increases their growing and raising rates. The feed demanding rate can also be improved whereby the cost of the feed can be greatly reduced.

BACKGROUND OF THE INVENTION

It has been widely carried out up to now that, in the hog raising and the fish raising, etc., the feed is given after adding the various additives thereto so that the diseases are suppressed and also the amount of the body growth is improved.

SUMMARY OF THE INVENTION

However, in the conventionally used feed additives, the effect is expected only to an extent of about 70% at best even if the amount of the body growth and the demand for the feed (amount of the feed intake), etc. are improved by using, for example, bifid bacteria, oligosacchrides, antibiotics, etc. when the demand for the feed is taken as an example, on an average 330 kg of the feed is necessary for one porker until it is put on the market.

Thus the cost therefor is not negligible and, if antibiotics are used for the therapy of the diseases, that will be a violation of the Drugs, Cosmetics and Medical Instruments Act and such a porker will have to be disposed. Further, in the conventional feed additives, when they are given to the livestock or the fish by a common method, there are some cases that the feed is excreted in an undigested state, and thus the bad smell is given off and cause a problem of the environmental pollution in the case of the livestock.

DETAILED DESCRIPTION OF THE PREFERRED EMBODIMENT

A feed additive for livestock in accordance with the present invention has been achieved under the above-mentioned circumstances. It comprises a first feed additive prepared by mixing and pickling 50–80% by weight of urne as a main ingredient, 1–3% by weight of shochu (Japanese distilled spirits) as a quality-improving agent, 18–45% by weight of sugar and 1–4% by weight of additives comprising vitamins for a predetermined period. A second feed additive is then prepared by mixing and pickling 65–85% by weight of urne as a main ingredient and 15–35% by weight of salt for a predetermined period. The first and second feed additives are then mixed in a ratio of about 1:1, and then 0.3–0.7% by weight of the mixture is added to the feed.

When the feed additive of the present invention is given to the livestock etc., citric acid and malic acid contained in large quantities in sarcocarp of urne activate the metabolic function, i.e. the operation of the citric acid cycle and the administered feed is efficiently converted to energy whereby the digestion of the feed becomes good and a very bad smell of the animal stall caused by the excretions can be solved. Further, the operation of the organic acid such as citric acid, malic acid, succinic acid and tartaric acid and also of triterpene such as oleanolic acid in the sarcocarp of urne is effective for the various diseases of the livestock and the like so that their diseased rate lowers and, at the same time, the activity of the livestock is improved and their bodies become strong whereby the amount of the body growth and the demand for the feed of the livestock, etc. are greatly improved.

Detailed embodiments of the present invention are that the present invention relates to the feed additive for the livestock and the like containing a lot of urne as a main ingredient in which, when it is given to the livestock such as pig and cow or raised fish, the diseases thereof are suppressed and the growing rate and the raising rate can be increased while the feed demanding rate can be improved whereby the cost for the feed can be greatly saved. More particularly, it relates to the feed additive for the livestock and the like where the first feed additive prepared by mixing and pickling 50–80% by weight of urne as a main ingredient, 1–3% by weight of shochu as a quality-improving agent, 18–45% by weight of sugar and 1–4% by weight of other additives such as vitamins for a predetermined period and the second feed additive prepared by mixing and pickling 65–85% by weight of urne as a main ingredient and 15–35% by weight of salt for a predetermined period are mixed in a ratio of about 1:1 and then 0.3–0.7% by weight thereof is added to the feed.

Thus, the applicant of the present invention has improved the already-disclosed invention in the Japanese Laid-Open Patent Publication Hei-07/79632 and, at first, the first feed additive is pickled by mixing 73% by weight of urne (unripe one) as a main ingredient, 1% by weight of shochu as a quality improving agent, 24% by weight of sugar and 2% by weight of other additives such as vitamins.

Then the second feed additive is pickled by mixing 70% by weight of urne (unripe one) as a main ingredient and 30% by weight of salt. The salt is essential for the feed additive and, when it is mixed with urne, a far better result is achieved.

Under such a state, each of the first feed additive and the second feed additive is preserved for a predetermined period (about one month for example) so that the decomposition of amygdalin, which is effective for the health of the livestock and contained in urne, into prussic acid is prevented.

After that, the above first feed additive and the above second feed additive are mixed in a ratio of about 1:1, then mixed as a feed additive with the feed for the livestock such as pig and cow or raised fish in an amount of 0.55% by weight and given to them about every six days whereupon the operation of the organic acid such as citric acid, malic acid, succinic acid and tartaric acid and also of triterpene such as oleanolic acid in thesarcocarp of urne is effective for the various diseases of the livestock and the like.

Thus, citric acid, malic acid and succinic acid contained in large quantities in sarcocarp of urne activate the metabolic function, I.e. the operation of the citric acid cycle (the cycle which takes charge of the function of metabolism by which the animal converts the food into energy) and the administered feed is efficiently converted to energy.

As a result thereof, the digestion of the feed becomes good and the problem caused by a very bad smell of the animal stall caused by the excretions can be solved as well.

The above-mentioned citric acid plays a very important role in the first stage of the said cycle and, when citric acid is in a deficient stage, the operation of the said cycle become bad whereby a converting efficiency to energy lowers and lactic acid which is a cause of fatigue is excessively produced in vivo resulting in a bad affection such as onset of the diseases, etc. to the livestock. However, when the feed additive of the present invention is given to the livestock and the raised fish, etc., the metabolic function of the livestock, etc. becomes quite active whereby their activity is promoted, their bodies become strong, the amount of the body growth and the demand for feed of the livestock, etc. are greatly improved and, in addition, the rate of catching a disease significantly lowers and, although the administration of the antibiotics can be greatly reduced, the survival rate is improved.

Thus, until now, the feed necessary for the porker until it is put on the market has been 330 kg per one pig, on an average. But, when the feed additive of the present invention is continuously administered to the porker, the demanding rate for the feed can be improved to an extent of 74% (about 244 kg) in case of the above mentioned 330 kg of the feed is defined as the feed demanding rate of 100% whereby the cost for the feed can be greatly reduced.

Incidentally, the growth rate of the livestock is usually around 80% while, according to the feed additive of the present invention, it can be increased to an extent of about 96%

Moreover, when the said food additive is administered to a breeding pig, it is now possible to extend the average life of the breeding pig to an extent of about twofold and, in addition, when we asked a public organization for the measurement of the said food additive, the result was that the meat after slaughter was found to be far more durable in terms of color and freshness as compared with the common meat.

Incidentally, in the above-mentioned embodiment, the first feed additive is a mixture of 73% by weight of urne (unripe one) as a main ingredient, 1% by weight of shochu as a quality-improving agent, 24% by weight of sugar and 2% by weight of other additives such as vitamins and the urne after the pickling may be made into either grains or powder.

Further, the urne in the second feed additive prepared by mixing 60% by weight of urne (unripe one) and 40% by weight of salt followed by pickling may be made into either grains or powder.

The present invention is constituted as mentioned above and, as a result of the administration of the feed additive of the present invention containing a lot of urne as a main ingredient to the livestock and the like, citric acid and malic acid contained in sarcocarp of urne activate the metabolic function, i.e. the operation of the citric acid cycle and the administered feed is efficiently converted to energy whereby the digestion of the feed becomes good and the very bad smell of animal stall caused by the excretion of the undigested feed can be solved. Further, as a result of the activation of the metabolic function, the activity of the livestock is improved and their bodies become strong whereby the amount of the body growth and the demand for feed of the livestock, etc. are greatly improved. Thus, the cost for the feed can be greatly saved and, in addition, it is believed that the proliferation of the miscellaneous microorganisms can be suppressed and the diseased rate lowers due to the sterilizing action of urne and, although the administration of the antibiotics can be greatly reduced, the growing rate and the survival rate of the livestock and the like are further improved whereby the cost can be greatly reduced. The present invention achieves such extremely useful effects.

What is claimed is:

1. A feed additive for livestock comprising:

a first feed additive prepared by mixing and pickling 50–80% by weight of urne (Japanese apricot) as a main ingredient, 1–3% by weight of shochu (Japanese distilled spirits) as a quality-improving agent, 18–45% by weight of sugar and 1–4% by weight of additives comprising vitamins for a predetermined period; and a second feed additive prepared by mixing and pickling 65–85% by weight of urne as a main ingredient and 15–35% by weight of salt for a predetermined period, mixing said first and second additives in a ratio of about 1:1, and then adding 0.340.7% by weight of the mixed first and second additives to the feed.

* * * * *